(12) United States Patent  
Chen

(10) Patent No.: US 8,209,821 B1
(45) Date of Patent: Jul. 3, 2012

(54) LOCKABLE RATCHET BUCKLE

(76) Inventor: Weiguo Chen, Ningbo (CN)

( * ) Notice: Subject to any disclaimer, the term of this patent is extended or adjusted under 35 U.S.C. 154(b) by 347 days.

(21) Appl. No.: 12/641,650

(22) Filed: Dec. 18, 2009

(51) Int. Cl.
  *B60P 7/00* (2006.01)
  *B60P 7/06* (2006.01)
  *B25B 25/00* (2006.01)

(52) U.S. Cl. ............ 24/68 CD; 24/68 R; 24/69 ST; 24/265 CD; 24/909; 254/217; 254/238; 254/239

(58) Field of Classification Search ............ 24/68 R, 24/68 CD, 69 CT, 69 ST, 70 ST, 909, 265 CD; 254/217, 218, 238, 239; 410/100
See application file for complete search history.

(56) References Cited

U.S. PATENT DOCUMENTS

| | | | |
|---|---|---|---|
| 907,008 A | 12/1908 | Clerke | |
| 4,227,286 A * | 10/1980 | Holmberg | 24/68 CD |
| 4,510,652 A * | 4/1985 | van Iperen | 24/68 CD |
| 5,369,848 A * | 12/1994 | Huang | 24/68 CD |
| 5,426,826 A * | 6/1995 | Takimoto | 24/68 CD |
| 5,494,387 A | 2/1996 | Ruegg | |
| 5,549,429 A | 8/1996 | Sergent | |
| 5,560,086 A * | 10/1996 | Huang | 24/68 CD |
| 5,894,638 A * | 4/1999 | Huang | 24/68 CD |
| 6,880,810 B1 * | 4/2005 | Hu | 254/218 |
| 7,374,152 B2 * | 5/2008 | Ruan | 254/217 |
| 7,510,168 B1 * | 3/2009 | Lin | 254/218 |
| 7,566,194 B1 | 7/2009 | Gray et al. | |
| 7,758,023 B2 * | 7/2010 | Chang | 254/218 |
| 2009/0013511 A1 * | 1/2009 | Chang | 24/68 CD |
| 2009/0283729 A1 * | 11/2009 | Carlson et al. | 254/218 |
| 2011/0041300 A1 * | 2/2011 | Lu | 24/68 CD |

OTHER PUBLICATIONS http://www.onlinesports.com/pages/I,GAR-601651499.html.
http://www.grainger.com/Grainger/items/2YJ34?cm_mmc=Google%2520Base-_-Material%2520Handling-_-Hoist%2520Winch%2520and%2520Rigging-_-2YJ34.

* cited by examiner

*Primary Examiner* — Robert J Sandy
*Assistant Examiner* — Tyler Johnson
(74) *Attorney, Agent, or Firm* — Joseph Z. Ellsworth

(57) ABSTRACT

The ratchet buckle for tightening a strap under a ratchet action provides a lock to positively prevent the ratchet buckle from inadvertently releasing the strap. The lock requires a removable handle to be installed on the ratchet buckle before the lock can be released. The removable handle extends the ratchet buckle crank arm for increased leverage in exercising the ratchet buckle and when removed reduces the overall size of the ratchet buckle and eliminates a crank arm portion that would otherwise extend beyond the ratchet buckle base.

18 Claims, 11 Drawing Sheets

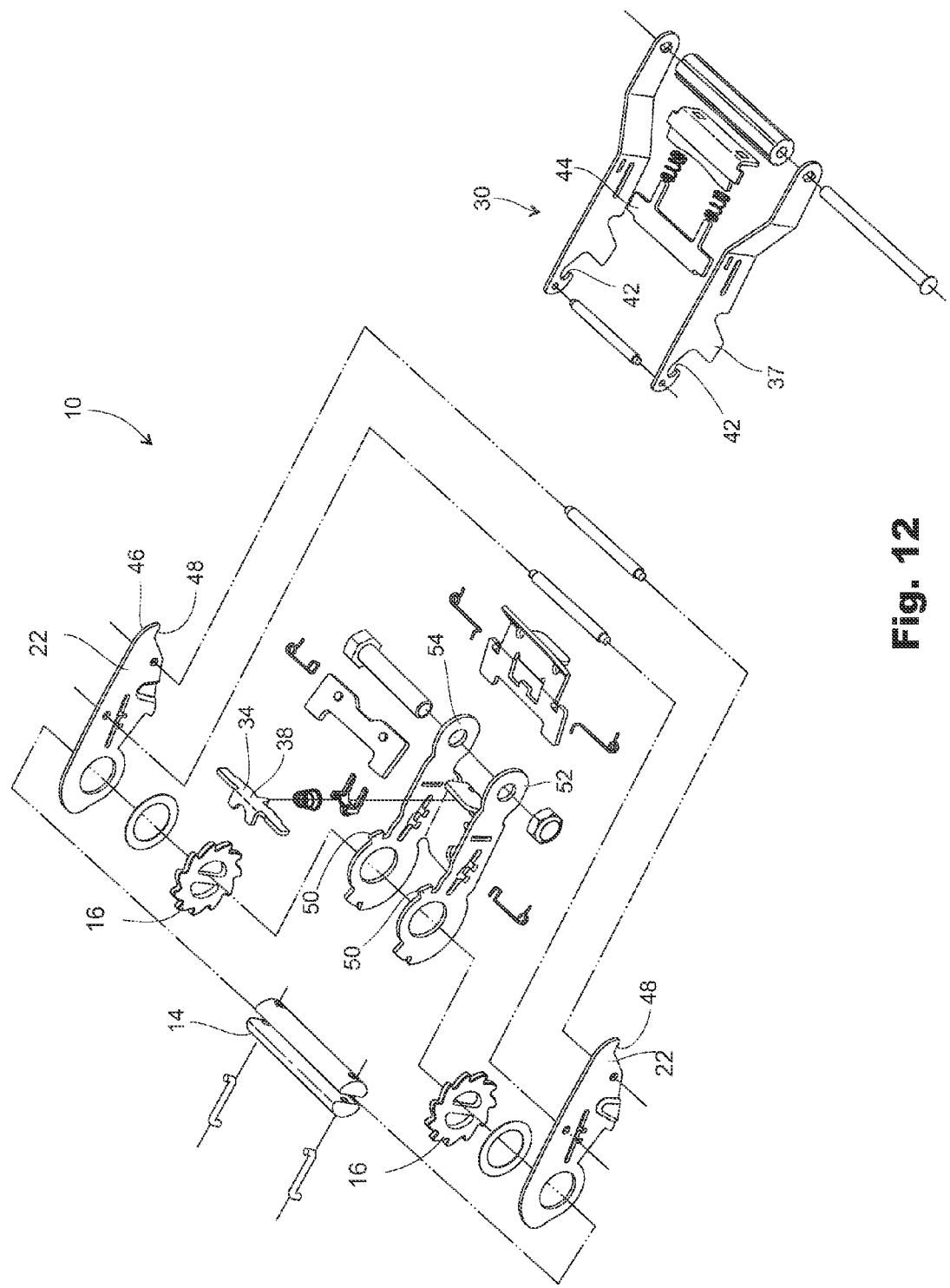

LOCKABLE RATCHET BUCKLE

BACKGROUND

1. Field of the Invention

This invention relates to tie-downs, as may be used to secure cargo to a vehicle.

2. Prior Art

It is known to have a ratchet buckle that secures cargo to a vehicle. It is also known to have a ratchet buckle in which a strap is pulled nearly taut through the buckle assembly and then tightened by a ratchet action in the buckle. Conventional ratchet buckles have a mechanism to prevent release of the strap after a ratchet mechanism has tightened the strap. However, the strap can still be inadvertently released such as by accidentally jarring the ratchet buckle. This could then lead to release of cargo the buckle was securing. Assuring that the ratchet buckle is not released becomes a safety issue as well as important for protecting the cargo.

The object of the present invention is to provide an improved ratchet buckle that automatically locks. Another object is to provide a removable handle that results in a ratchet buckle of reduced size during transport. Another object is to provide a lock that can only unlock the ratchet buckle when the handle moves toward the ratchet buckle base, thereby preventing inadvertent release of the ratchet buckle when the handle is removed.

SUMMARY OF THE INVENTION

These objects are achieved by a lock and key feature that functions in cooperation with a removable handle and positively locks the ratchet wheel from rotating when the handle is not installed on the ratchet buckle.

The lock and key feature can be used generally with tie down buckles that employ a ratcheting action to tighten a strap that is positioned to tie down cargo. Typical of ratcheting tie-down buckles, a first or forward strap is secured to a position remote from the buckle, often by a hook on its distal end. A second or rearward strap is also secured to a different position remote from the buckle, also usually through a hook on its distal end with its proximal end secured to a transverse shaft between base sides at the back of the buckle, typically without length adjustment. The proximal end of the forward strap is connected to a spindle that is reciprocally rotated by a user moving a handle relative to a base, which handle in turn rotates a ratchet wheel to which the spindle is attached. The ratchet wheel is prevented from counter rotating by a pawl, all in a normal ratchet action.

The positive lock and key elements that can be employed with a ratchet buckle includes the following features.

Ratchet wheels are connected on each end of a spindle on which a strap wraps. The lock is achieved by positively preventing rotation of the ratchet wheel. The lock and key ratchet buckle features a removable handle that is conveniently mounted releasably to a crank arm. The crank arm common in ratchet buckles is used to crank the ratchet wheel and spindle in the base. The essence of the lock and key is that the ratcheting action of the buckle is enabled only when the handle is mounted on the crank arm. In use, the handle moves the crank into a lock position. The handle, which acts on a spring-loaded key, acts to move the key out of the lock for operation of the ratchet. However, with the crank arm in lock position, when the handle is disengaged from the crank arm, the key under spring action moves into engagement with the lock. The lock is connected to the ratchet plate. When the crank is in lock position, the ratchet plate engages the ratchet wheel, preventing the ratchet wheel from rotating. When the key engages the lock with the handle removed, the ratchet plate cannot be withdrawn from the ratchet wheel.

The lock comprises legs depending from the release arm, which is connected to the ratchet plate, forming an inverted 'U' shape. The key extends from the ratchet buckle base and moves between the legs of the inverted U-shaped lock to prevent the lock from moving away from the ratchet wheel.

When the handle is mounted with the crank arm lowered or lock position. The handle is the rotated on the crank arm and pushes the key down out of the lock, which then allows the ratchet plate to be withdrawn from its lock position.

An added advantage is that the ratchet buckle is compact with the long handle removed. The long handle is advantageous because it adds leverage to the buckle over a short handle the approximate size of the base.

BRIEF DESCRIPTION OF THE DRAWINGS

The ratchet buckle with an excess strap retention arm is illustrated in the following 15 figures.

FIG. 11 is a bottom view of the base and key of FIG. 10a.

FIG. 12 is an exploded perspective view of the ratchet buckle of FIG. 1.

DETAILED DESCRIPTION OF THE PREFERRED EMBODIMENT

Figure 1:
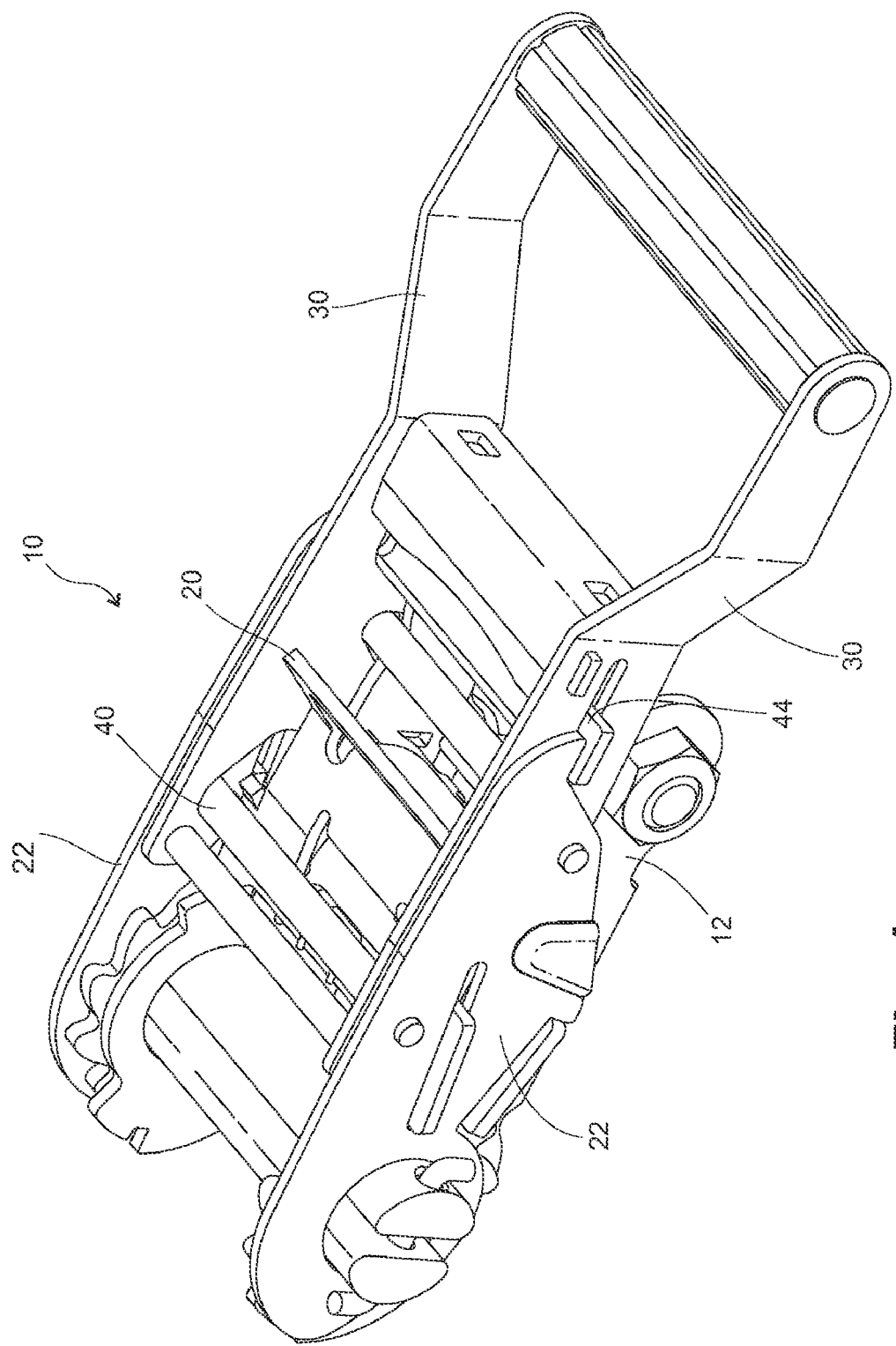
FIG. 1. is a perspective view of the ratchet buckle of the present invention, shown with the removable handle installed on the crank arm.
Figure 2:
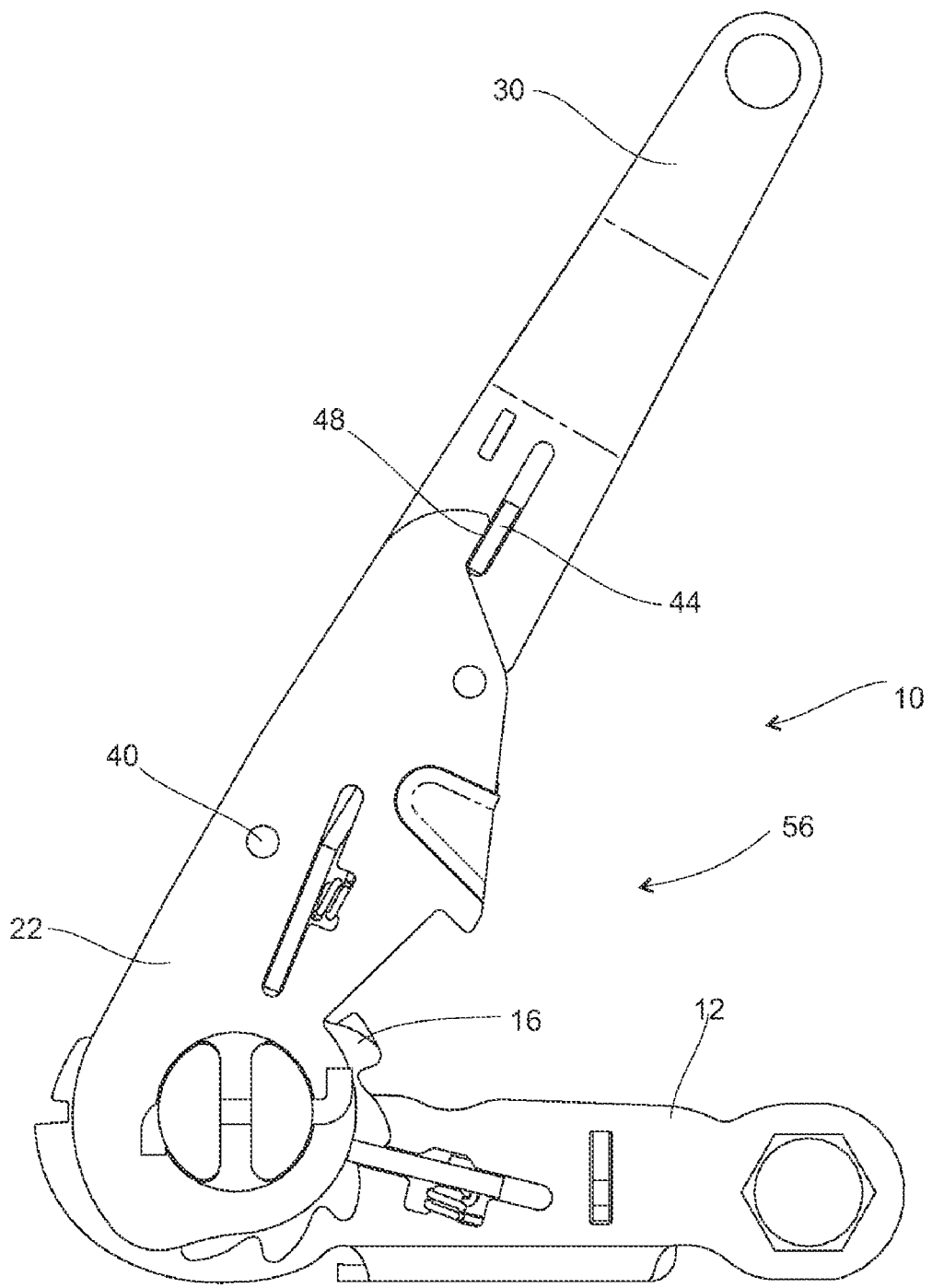
FIG. 2 is a side view of the ratchet buckle of FIG. 1, shown with the crank arm and handle in a raised position above the base.
Figure 3:
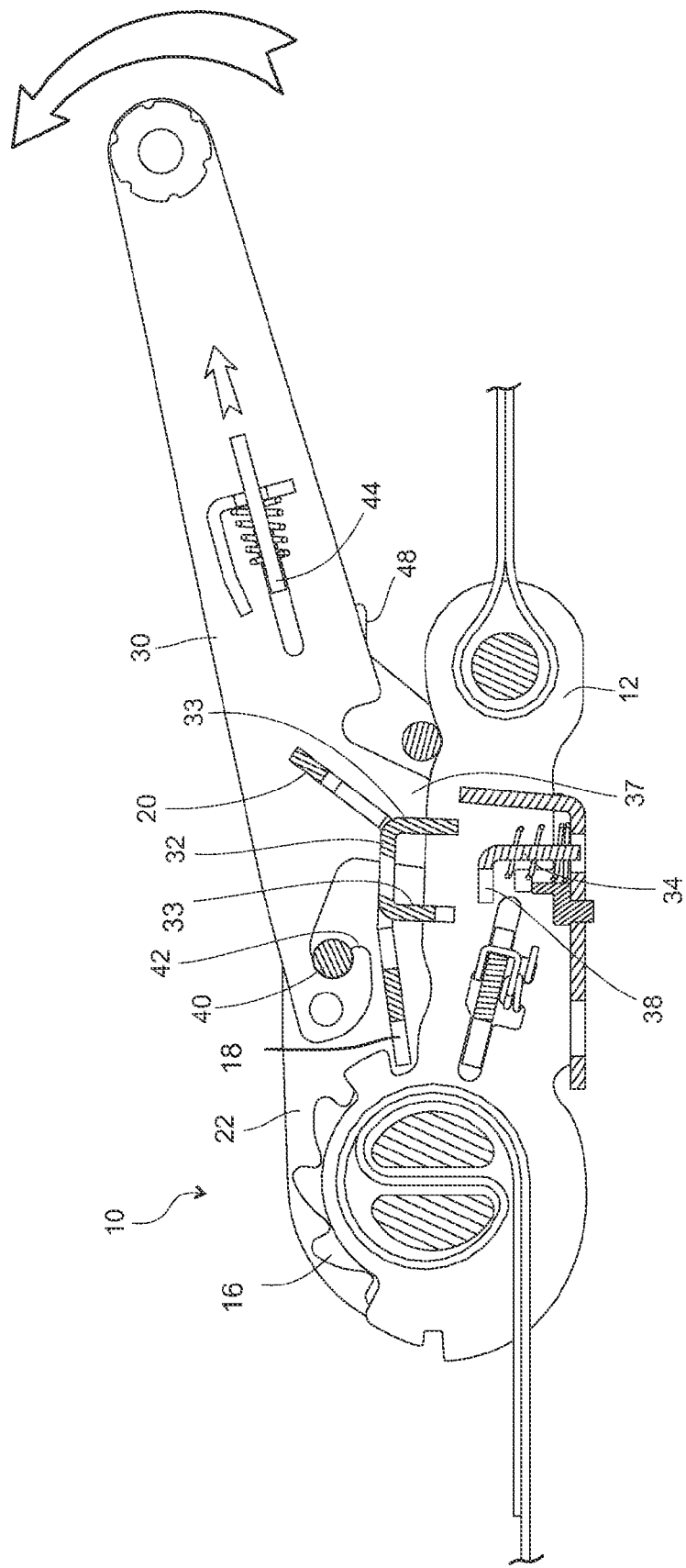
FIG. 3 is side cross-sectional view of the ratchet buckle of FIG. 1.
Figure 4:
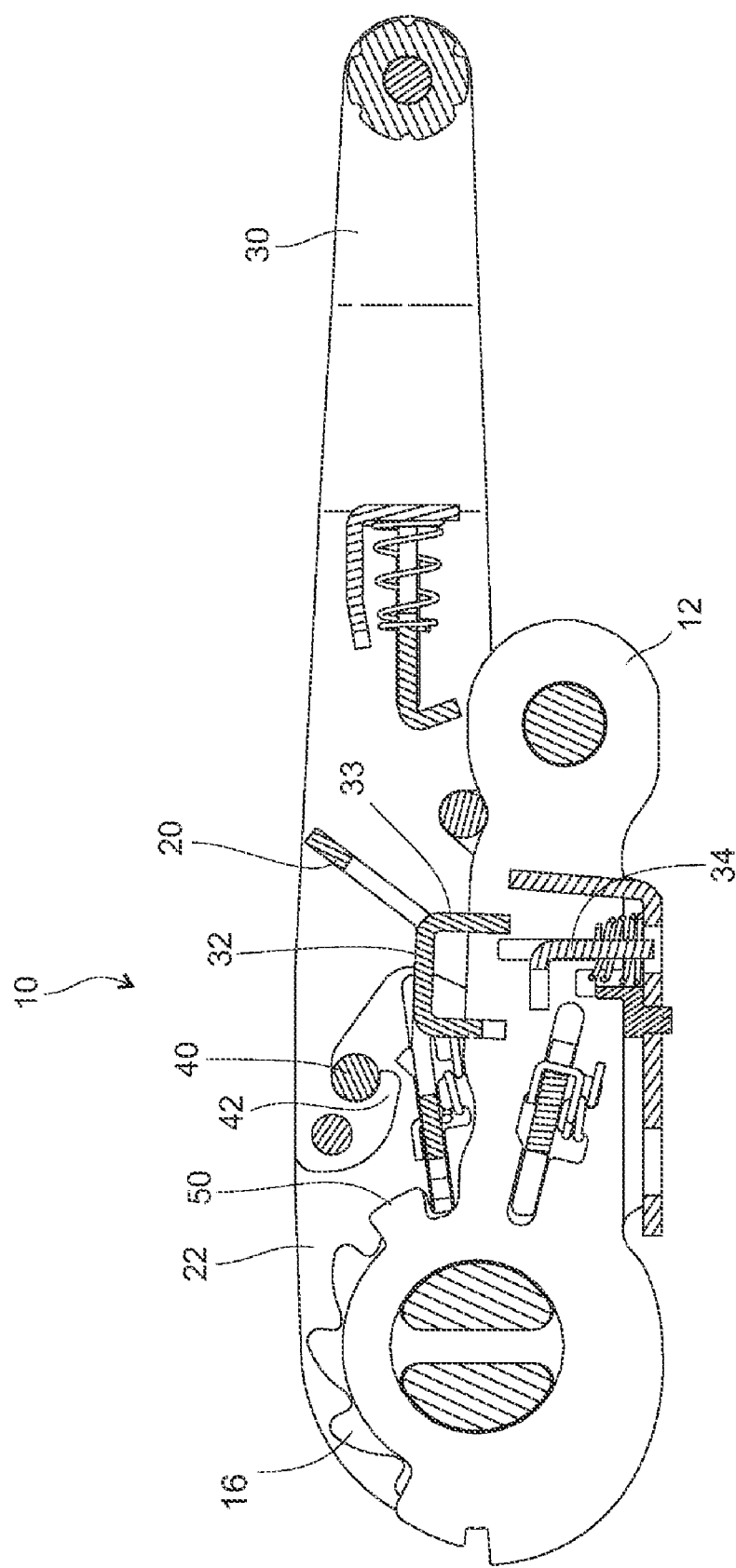
FIG. 4 is a side cross-sectional view of the ratchet buckle of FIG. 2, shown with the crank arm and handle in a lowered position.
Figure 5:
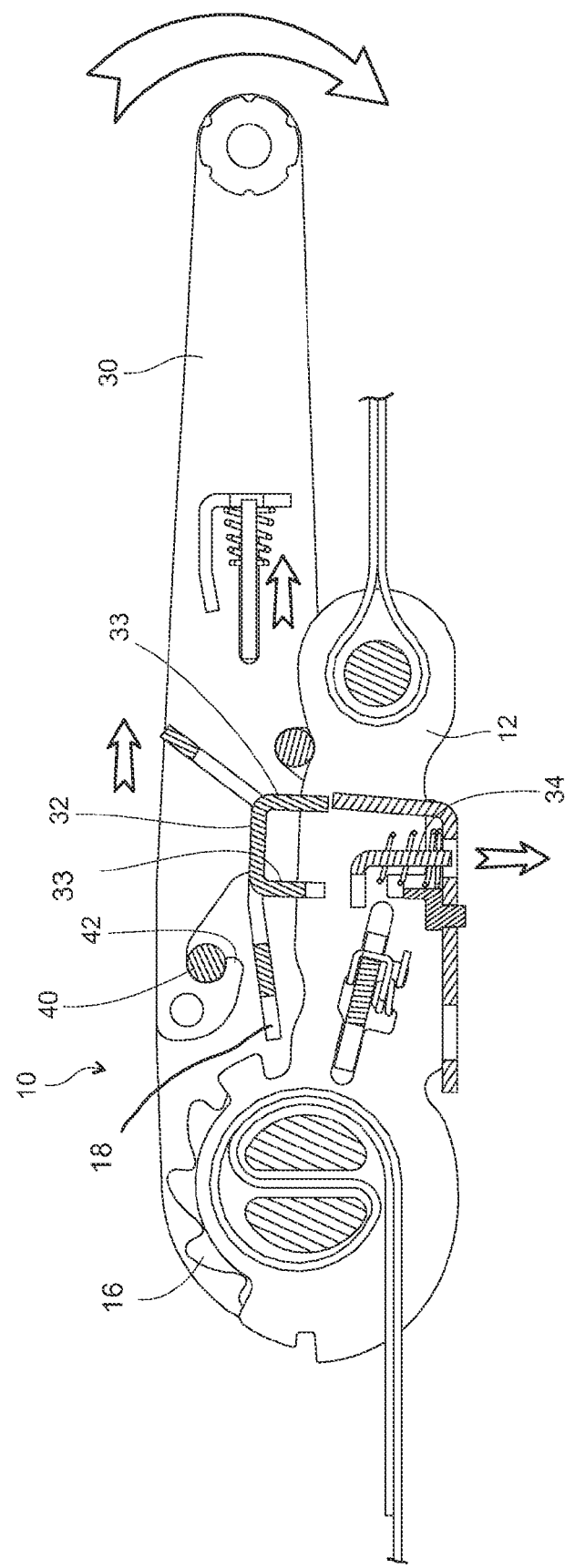
FIG. 5 is a side cross-sectional view of the ratchet buckle of FIG. 4 shown in a lock release position with the handle interface portion urging the key downward out of the inverted U-shaped lock.
Figure 6:
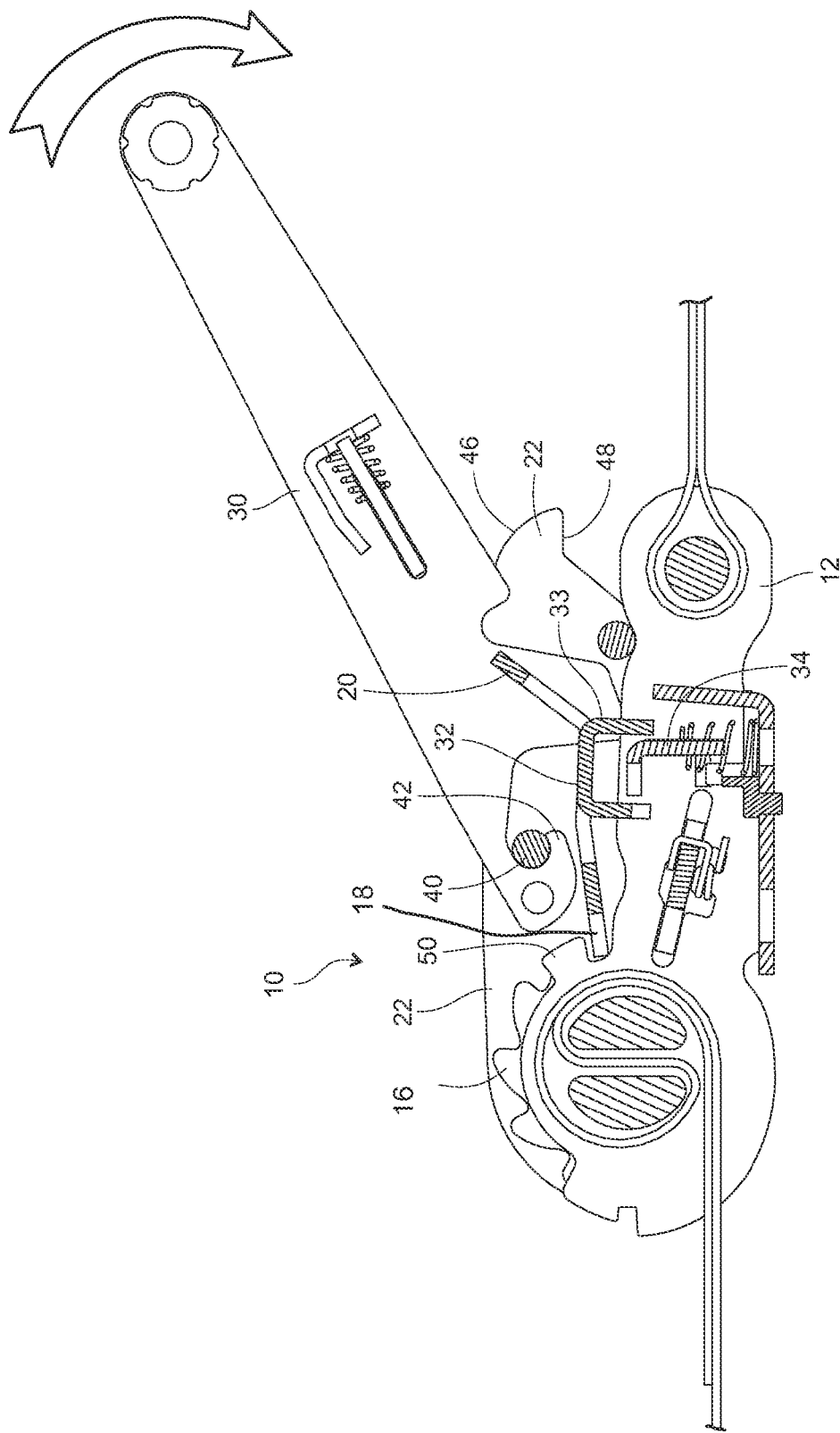
FIG. 6 is a side cross-sectional view of the ratchet buckle of FIG. 5 shown with the key within the lock.
Figure 7:
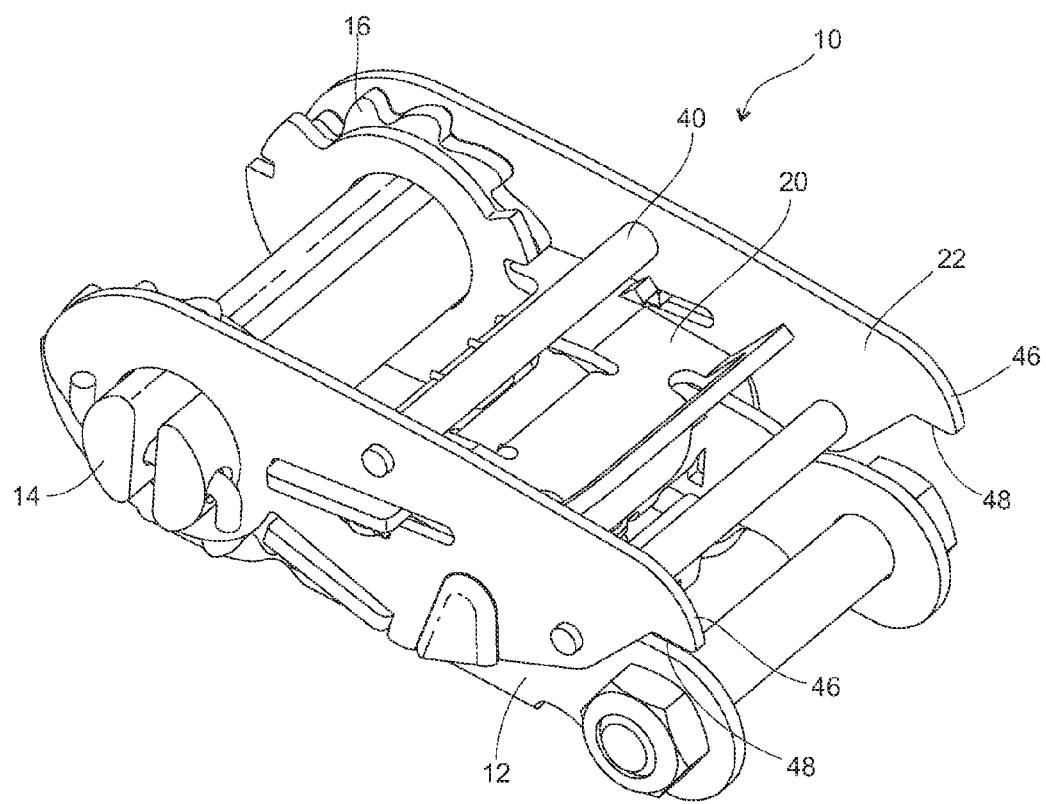
FIG. 7 is perspective view of the ratchet buckle shown in lock position with the handle removed.
Figure 8:
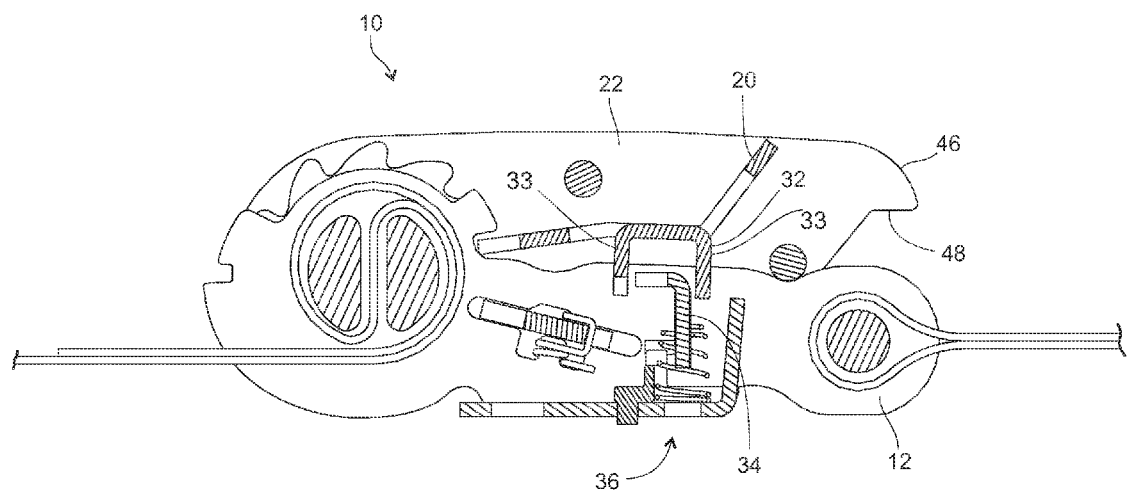
FIG. 8 is a side cross-sectional view of the ratchet buckle of FIG. 7.
Figure 9:
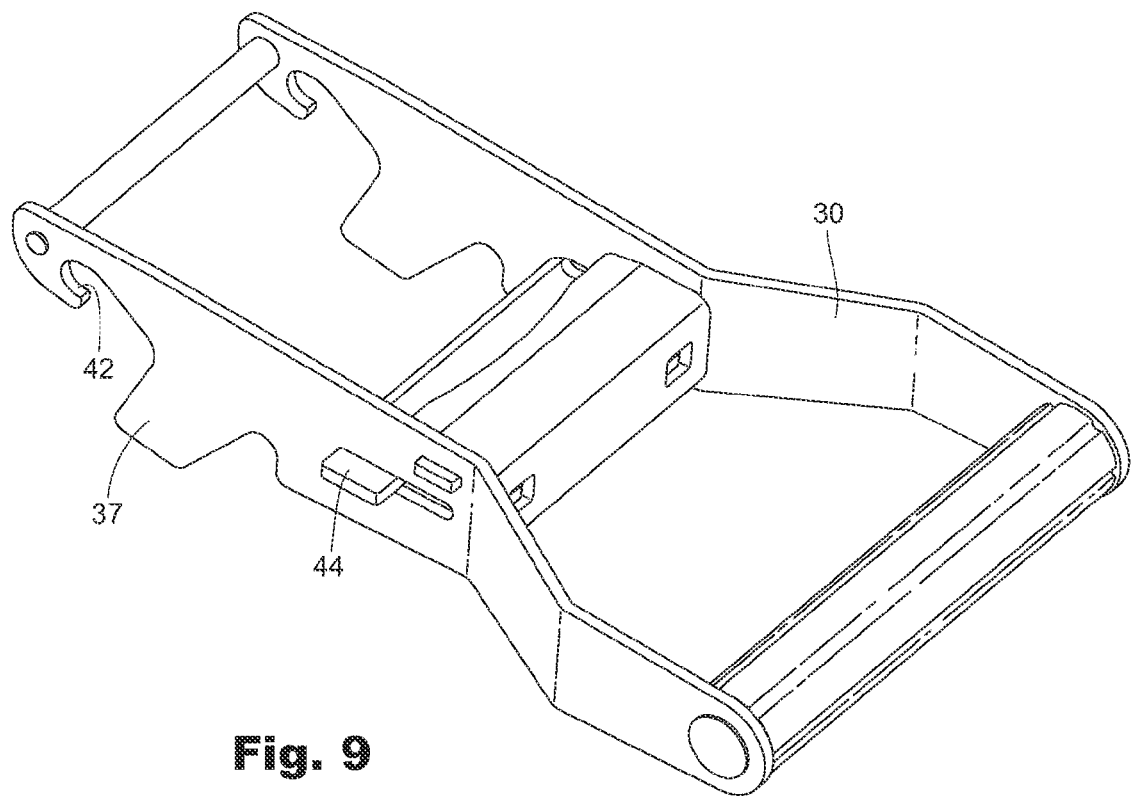
FIG. 9 is a perspective view of the removable handle.
Figure 10:
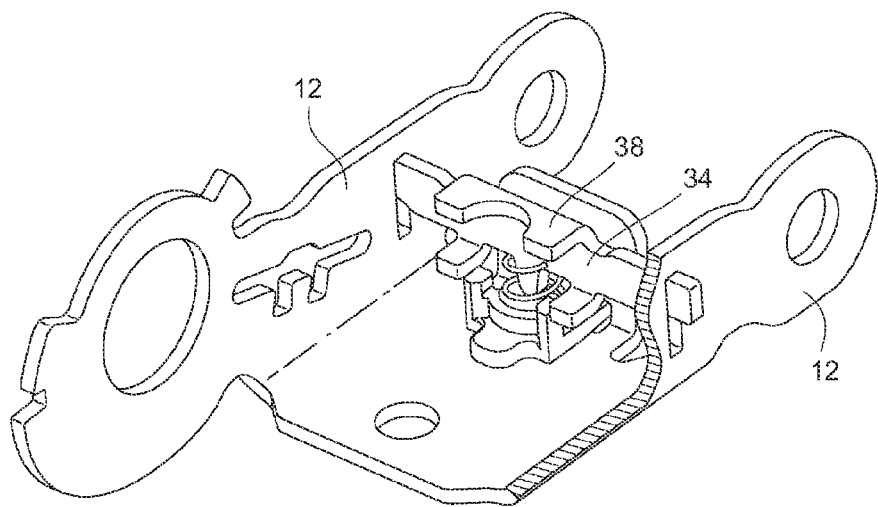
FIG. 10 is a perspective cut-away view of the base and the key.
Figure 11:
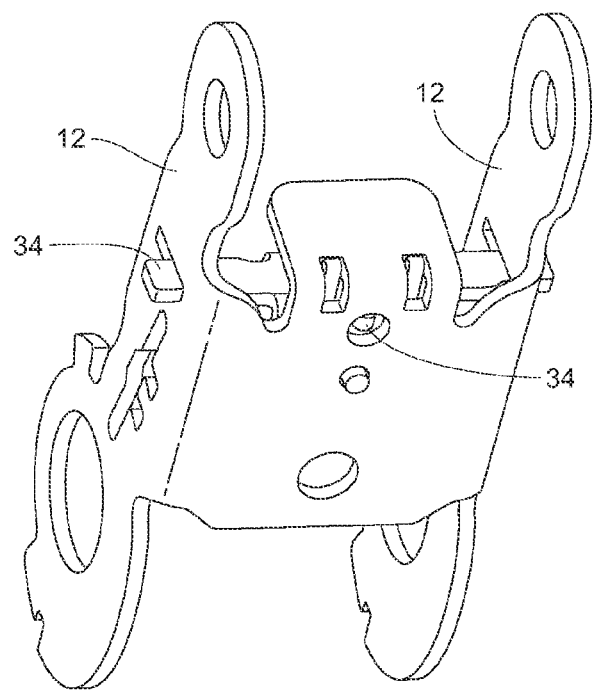

The ratchet buckle 10 of the present invention for tightening a strap includes a base 12, a spindle 14 journaled to the base 12, a ratchet wheel 16 attached to the spindle 14, and a ratchet plate 18 as a pawl that cooperates with the ratchet wheel 16 in a conventional ratchet action, a release arm 20 intermediate the base 12 and slidable in a crank arm 22 and connected to the ratchet plate 18, the release arm 20 being adapted to disengage the ratchet plate 18 from the ratchet wheel 16 when the release arm 20 is pulled, and the crank arm 22 also being rotatably journaled in the base 12 by the spindle 14 on each ratchet buckle side, the spindle 14 being adapted to wind the strap around it as the spindle 14 is rotated by the crank arm 22 relative to the base 12.

The ratchet buckle 10 further comprises a removable handle 30 that is pivotable on and removable from the crank arm 22 when the handle 30 is installed thereon and which when connected thereto effectively extends the crank arm 22 rearward substantially past the base 12, typically doubling the effective length of the crank arm 22.

A lock 32 cooperates with the ratchet handle 30 to prevent inadvertent release of a tightened strap on the spindle. The lock 32 comprises legs 33 depending from the release arm 20 forming an inverted "U" that moves up and down with the crank arm 22. A key 34 is urged upward from the base 12 under spring bias into the lock 32 when the crank arm 22 is lowered into a lock position 36 thereby preventing movement of the release arm 20. With the ratchet plate 18 thus locked into engagement with the ratchet wheel 16, the spindle 14 cannot move.

A depressor portion 37 of the handle 30 is configured to engage a key interface portion 38 such that as the handle 30 is rotated downward on a crank arm connection shaft 40 that extends between crank arm sides, the depressor portion 36 engages the key interface portion 38 such that the key 34 is urged downward as the handle 30 is further lowered until the key 34 is moved out of the lock 32. Thus, the ratchet plate 18 is able to disengage from its lock position 36 with the ratchet wheel 16 by pulling the release arm 20.

As shown in the figures, when the handle 30 is removed from the crank arm 22 with the crank arm 22 in lock position 36 with the lock 32 engaging the key 34, as the handle depressor portion 36 is removed with the handle 30 the ratchet plate 18 cannot be withdrawn from engagement with the ratchet plate 18 thus preventing the ratchet plate 18 from rotating and releasing the strap. The key 34 can only be released from the lock 32 by installing the handle 30 on the crank arm 22 and lowering it with the depressor portion 36 urging the key 34 out of the lock 32. The ratchet plate 18 is then able to be withdrawn from the ratchet wheel 16.

A hook 42 on a handle connect end 43 is adapted such that it can be hooked around a crank arm connection shaft 40 extending between crank arm sides. The handle 30 is thus pivotable on the crank arm connection shaft 40 and removable from the base 12 by disengaging the hook 42 from the crank arm connection shaft 40. The handle 30 is adapted to function as a rigid extension of the crank arm 22 cooperating with the crank arm 22 to rotate the ratchet wheel 16 when the handle hook 42 engages the crank arm connection shaft 40 and a handle pull 44 slidable longitudinally on the handle engages a ledge 48.

The ledge 48 is on the crank arm 22 as a catch adapted to match and receive the handle pull 44, typically under a rearward end 46 of the crank arm 22. The handle pull 44 is urged forward under spring bias and engages the ledge 48 when the handle 30 is pivoted toward the crank arm 22 by extending under the ledge 48 thereby securing the handle 30 to the crank arm 22 in cooperation with the hook 42 on the crank arm connection shaft 40. The handle pull 44 is releasable from the ledge 48 by pulling the handle pull 44 away from ledge. With the handle pull 44 disengaged from the ledge the handle 30 is able to be pivoted on the crank arm connection shaft 40 away from the crank and the handle hook 42 is able to be removed from the crank arm connection shaft 40. The handle 30 is thus removed from the crank arm 22.

Typically a lug 50 is provided on base sides 52, 54 that divides motion of the crank arm 22 between ratchet position 56 and lock position 36. In ratchet position 56, the ratchet plate 18 is above the lug 50; in lock position, the ratchet plate 18 is below the lug 50, engaging both the ratchet plate 18 and the lug 50 to prevent rotation of the ratchet plate 18. Thus, the lug 50 prevents the ratchet plate 18 from inadvertently moving out of either position. As the handle and crank lifts the ratchet plate 18 over and past the lug 50, the ratchet plate 18 is moved out of lock position 36. Consequently, although the key 34 is allowed to extend under spring bias the lock 32 is lifted above the key 34 as the crank arm 22 is moved into ratchet position 56. When the strap is tightened as desired, the process is reversed and the handle 30 is removed. When the handle 30 is removed the ratchet buckle 10 cannot release the strap until the handle 30 is again mounted on the crank arm 22.

Having described the invention, what is claims is as follows:

1. A ratchet buckle for tightening a strap including a base, a spindle rotatably attached to the base, a ratchet wheel attached to the spindle and a ratchet plate cooperating with the ratchet wheel in a ratchet action, a release arm intermediate the base and slidable in a crank arm and connected to the ratchet plate, the release arm being adapted to disengage the ratchet plate from the ratchet wheel when the release arm is pulled, and the crank arm rotatably journaled in the base by the spindle on each ratchet buckle side to which the crank arm and the ratchet wheel are secured, the spindle adapted to wind the strap around it as the spindle is rotated by the crank arm relative to the base, further comprising:

a handle pivotable on the crank arm,
   a lock comprising legs depending from the release arm forming an inverted "U" that moves up and down with the crank arm,
   a key urged upward from the base under spring bias into the lock when the crank arm is lowered into a lock position thereby preventing movement of the release arm such that the ratchet plate is locked into engagement with the ratchet wheel,
   a crank arm connection shaft extending between crank arm sides,
   a depressor portion of the handle configured to engage a key interface portion such that as the handle is rotated on the crank arm connection shaft downward the depressor portion engages the key interface portion such that the key is urged downward as the handle is further lowered until the key is moved out of the lock, therein allowing the ratchet plate to disengage from its lock position with the ratchet wheel by pulling the release arm.

2. The ratchet buckle of claim 1 wherein the handle is removable from the crank arm.

3. The ratchet buckle of claim 2 wherein the removable handle when connected to the crank arm extends the crank arm rearward substantially past the base.

4. The ratchet buckle of claim 2 wherein when the handle is removed with the crank arm in lock position with the lock engaging the key, as the handle depressor portion is removed with the handle the ratchet plate cannot be withdrawn from engagement with the ratchet wheel thus preventing the ratchet wheel from rotating and releasing the strap.

5. The ratchet buckle of claim 4 wherein the key is releasable from the lock by installing the handle on the crank arm and lowering it with the depressor portion urging the key out of the lock therein allowing the ratchet plate to be withdrawn from the ratchet wheel.

6. The ratchet buckle of claim 5 further comprising a crank arm connection shaft extending between crank arm sides and a hook on a handle connect end that may be hooked around the crank arm connection shaft such that the handle is pivotable on the crank arm connection shaft and removable from the base by disengaging the hook from the crank arm connection shaft.

7. The ratchet buckle of claim 6 further comprising a ledge on the crank arm, a handle pull slidable longitudinally on the handle and adapted to releasably engage the ledge on the crank arm as the handle is pivoted toward the crank arm thereby securing the handle to the crank arm in cooperation with the hook on the crank arm connection shaft.

8. The ratchet buckle of claim 7 wherein the handle is adapted to function as a rigid extension of the crank arm cooperating with the crank arm to rotate the ratchet wheel when the handle hook engages the crank arm connection shaft and the handle pull engages the ledge.

9. The ratchet buckle of claim 7 wherein the handle pull is releasable from the ledge by pulling the handle pull away from ledge, therein enabling the handle to be pivoted on the crank arm connection shaft away from the crank arm such that the handle hook is removable from the crank arm connection shaft, therein enabling the handle to be removed from the crank arm.

10. The ratchet buckle of claim 2 further comprising a crank arm connection shaft extending between base sides and a hook on the handle adapted to be hooked around the crank arm connection shaft such that the handle is pivotable on the crank arm connection shaft and removable from the base by disengaging the hook from the crank arm connection shaft.

11. The ratchet buckle of claim 10 further comprising
a ledge on the crank arm,
a handle pull adapted to releasably engage the ledge on the crank arm such that as the handle is pivoted toward the crank arm the pull engages the ledge thereby securing the handle to the crank arm in cooperation with the hook on the crank arm connection shaft.

12. The ratchet buckle of claim 11 wherein the handle is adapted to function as a rigid extension of the crank arm cooperating with the crank arm to rotate the ratchet wheel when the handle hook engages the crank arm connection shaft and the handle pull engages the ledge.

13. The ratchet buckle of claim 11 wherein the handle pull is releasable from the ledge by pulling the handle pull away from ledge, therein enabling the handle to be pivoted on the crank arm connection shaft away from the crank arm such that the handle hook is removable from the crank arm connection shaft, therein enabling the handle to be removed from the crank arm.

14. A ratchet buckle for tightening a strap including a base, a spindle rotatably attached to the base, a ratchet wheel attached to the spindle and a ratchet plate cooperating with the ratchet wheel in a ratchet action, a release arm intermediate the base and slidable in a crank arm and connected to the ratchet plate, the release arm being adapted to disengage the ratchet plate from the ratchet wheel when the release arm is pulled, with the crank arm rotatably journaled in the base by the spindle on each ratchet buckle side to which the crank arm and the ratchet wheel are secured, the spindle adapted to wind the strap around it as the spindle is rotated by the crank arm relative to the base, and further comprising a removable handle attachable to and extending the crank arm, and
a crank arm connection shaft extending between base sides and a hook on a handle connect end that may be hooked around the crank arm connection shaft such that the handle is pivotable on the crank arm connection shaft and removable from the base by disengaging the hook from the crank arm connection shaft,
a ledge on the crank arm,
a handle pull slidable longitudinally on the handle and adapted to releasably engage the ledge on the crank arm as the handle is pivoted toward the crank arm thereby securing the handle to the crank arm in cooperation with the hook on the crank arm connection shaft.

15. The ratchet buckle of claim 14 wherein the handle is adapted to function as a rigid extension of the crank arm cooperating with the crank arm to rotate the ratchet wheel when the handle hook engages the crank arm connection shaft and the handle pull engages the ledge.

16. The ratchet buckle of claim 14 wherein the handle pull is releasable from the ledge by pulling the handle pull away from ledge, therein enabling the handle to be pivoted on the crank arm connection shaft away from the crank arm such that the handle hook is removable from the crank arm connection shaft, therein enabling the handle to be removed from the crank arm.

17. A ratchet buckle for tightening a strap including a base, a spindle rotatably attached to the base, a ratchet wheel attached to the spindle and a ratchet plate cooperating with the ratchet wheel in a ratchet action, a release arm intermediate the base and slidable in a crank arm and connected to the ratchet plate, the release arm being adapted to disengage the ratchet plate from the ratchet wheel when the release arm is pulled, with the crank arm rotatably journaled in the base by the spindle on each ratchet buckle side to which the crank arm and the ratchet wheel are secured, the spindle adapted to wind the strap around it as the spindle is rotated by the crank arm relative to the base, further comprising:
a removable handle pivotable on the crank arm,
a lock comprising legs depending from the release arm forming an inverted "U" that moves up and down with the crank arm,
a key urged upward from the base under spring bias into the lock when the crank arm is lowered into a lock position thereby preventing movement of the release arm such that the ratchet plate is locked into engagement with the ratchet wheel,
a crank arm connection shaft extending between crank arm sides and a hook on the handle adapted to be hooked around the crank arm connection shaft such that the handle is pivotable on the crank arm connection shaft and removable from the base by disengaging the hook from the crank arm connection shaft,
a depressor portion of the handle configured to engage a key interface portion such that as the handle is rotated on the crank arm connection shaft downward the depressor portion engages the key interface portion such that the key is urged downward as the handle is further lowered until the key is moved out of the lock, therein allowing the ratchet plate to disengage from its lock position with the ratchet wheel by pulling the release arm,
wherein when the handle is removed with the crank arm in lock position with the lock engaging the key, as the handle depressor portion is removed with the handle the ratchet plate cannot be withdrawn from engagement with the ratchet plate thus preventing the ratchet plate from rotating and releasing the strap, and
wherein the key is releasable from the lock by installing the handle on the crank arm and lowering it with the depressor portion urging the key out of the lock therein allowing the ratchet plate to be withdrawn from the ratchet wheel,
a ledge on the crank arm,
a handle pull slidable longitudinally on the handle and adapted to releasably engage the ledge on the crank arm as the handle is pivoted toward the crank arm thereby securing the handle to the crank arm in cooperation with the hook on the crank arm connection shaft.

18. The ratchet buckle of claim 17 wherein the handle pull is releasable from the ledge by pulling the handle pull away from ledge, therein enabling the handle to be pivoted on the crank arm connection shaft away from the crank arm such that the handle hook is removable from the crank arm connection shaft, therein enabling the handle to be removed from the crank arm.

* * * * *